United States Patent [19]

Fujisawa et al.

[11] Patent Number: 4,941,669
[45] Date of Patent: Jul. 17, 1990

[54] FIBER-REINFORCED PISTON RING FOR INTERNAL COMBUSTION ENGINE

[75] Inventors: Yoshikazu Fujisawa; Tsunehisa Hata; Tadayoshi Hayashi, all of Saitama, Japan

[73] Assignee: Honda Giken Kogyo Kabushiki Kaisha, Tokyo, Japan

[21] Appl. No.: 315,398

[22] Filed: Feb. 23, 1989

[30] Foreign Application Priority Data

Jan. 24, 1988 [JP] Japan ................. 63-41393
Jan. 24, 1988 [JP] Japan ................. 63-41394

[51] Int. Cl.⁵ .............................. F16J 9/20; F16J 9/22
[52] U.S. Cl. ........................ 277/235 R; 277/235 A; 277/DIG. 6; 428/611; 428/614
[58] Field of Search .......... 277/223, 224, 235 R, 277/235 A, DIG. 6; 123/193 P; 428/611, 614

[56] References Cited

U.S. PATENT DOCUMENTS

| 3,871,834 | 3/1975 | Kuniya et al. | 428/611 |
| 4,106,782 | 8/1978 | Hyde et al. | 277/224 |
| 4,359,230 | 11/1982 | Bruni | 277/224 |

FOREIGN PATENT DOCUMENTS 2235694  2/1974  Fed. Rep. of Germany ........ 92/223

Primary Examiner—Allan N. Shoap
Assistant Examiner—Scott Cummings
Attorney, Agent, or Firm—Lyon & Lyon

[57] ABSTRACT

A fiber-reinforced piston ring for an internal combustion engine comprised of composite body of reinforcing fiber which is long carbon fibers oriented in a peripheral direction of the piston ring and having a fiber volume fraction in a range of 5% to 60% in a matrix of an aluminum alloy. In alternate embodiments the composite body is provided with a layer of aluminum alloy, or a hard layer for wear resistance, or a combination of an aluminum alloy layer and a hard layer.

8 Claims, 3 Drawing Sheets

FIBER-REINFORCED PISTON RING FOR INTERNAL COMBUSTION ENGINE

BACKGROUND OF THE INVENTION

1. Field Of The Invention

The present invention relates to a fiber-reinforced piston ring for an internal combustion engine.

2. Description Of The Prior Art

Piston rings are conventionally formed of an iron-base material such a cast iron, a spring steel or a stainless steel. The recent trend in internal combustion engines is to increase the speed of rotation and the output, whereby a further reduction in the size of a piston ring is desirable in view of the increased speed of rotation while an increase in rigidity is desirable for the piston ring to accommodate the increase in output.

However, prior art piston rings have the problem of a large inertial mass because of their high specific gravities (7.0 to 7.9). As a result, when the piston speed is increased with an increase in the speed of rotation of the engine, the pressure of a combustion gas is balanced with the inertial force of the piston ring, causing a so-called fluttering which results in a condition wherein the piston ring is floating without contacting the inner opposed wall surfaces of the piston ring groove, whereby the sealing effect is reduced and causes an increase in the amount of gas blow-by.

One attempted solution to this problem has been to reduce the width (axial width) of the piston ring of an iron-based material. However this results in a problem of buckling and undulation of the piston ring by the increased pressure of the combustion gas caused by the increase in output of the engine, because the thin piston ring is less rigid than prior conventional piston rings.

SUMMARY OF THE INVENTION

It is an object of the present invention to provide a piston ring for the piston of an internal combustion engine, which is light in weight and has a higher rigidity for accommodating the increases in speed of rotation and output of the engine.

It is another object of the present invention to provide a piston ring of this type, which has good machinability.

It is a further object of the present invention to provide a piston ring of this type, which exhibits excellent sliding characteristics against the inner wall of a cylinder bore in cylinder blocks made of various materials and against the ring groove inner walls of pistons made of various materials.

To accomplish the above objects, according to the present invention, there is provided a fiber-reinforced piston ring for an internal combustion engine, comprising a reinforcing fiber which is a long carbon fiber having a fiber volume fraction set in a range of 5 to 60% and oriented in a peripheral direction of the piston ring with the fiber in a matrix of an aluminum alloy.

In addition, according to the present invention, there is provided a fiber-reinforced piston ring for an internal combustion engine, comprising a main annular composite body formed of a reinforced fiber which is a long carbon fiber having a fiber volume fraction set in a range of 5 to 60% in a matrix of an aluminum alloy, and a single-material layer of an aluminum alloy covering the surface of the main composite body.

Further, according to the present invention, there is provided a fiber-reinforced piston ring for an internal combustion engine, comprising a main-annular composite body formed of a reinforcing fiber which is a long carbon fiber having a fiber volume fraction set in a range of 5 to 60% and oriented in a peripheral direction of the piston ring in a matrix of an aluminum alloy, a single-material layer formed of an aluminum alloy and covering the surface of the main composite body, and a hard layer covering the surface of the single-material layer.

Still further, according to the present invention, there is provided a fiber-reinforced piston ring for an internal combustion engine, comprising a main annular composite body formed of a reinforcing fiber which is a long carbon fiber having a fiber volume fraction set in a range of 5 to 60% and oriented in a peripheral direction of the piston ring in a matrix of an aluminum alloy, and a hard layer covering the entire surface of the main composite layer.

With the above structures, it is possible to provide a reduction in weight of the piston ring to reduce the inertial mass thereof, thereby preventing the fluttering of the piston ring resulting from an increase in the speed of rotation of the engine and thus an increase in piston speed, thus decreasing the amount of gas blow-by.

In addition, since a carbon fiber is used and oriented as described above, it is possible to provide an increase in rigidity of the piston ring, thereby preventing the buckling and undulation of the piston ring due to a higher pressure of a combustion gas resulting from the increase in output of the engine.

Accordingly, the piston ring according to the present invention can adequately accommodate the increases in speed of rotation and output of the internal combustion engine. However, if the fiber volume fraction of the long carbon fiber Is less than 5%, the rigidity is reduced. On the other hand, if the fiber volume fraction exceeds 60%, the fillability of the aluminum alloy is degraded.

Additionally, with the above structure, it is possible to provide a light and higher rigidity piston ring with a hard layer having improved sliding characteristics, such as resistances to seizure, wearing and fusing.

The above and other objects, features and advantages of the invention will become apparent from a reading of the following description of the preferred embodiments, taken in conjunction with the accompanying drawings.

DESCRIPTION OF THE PREFERRED EMBODIMENTS

Figure 1:
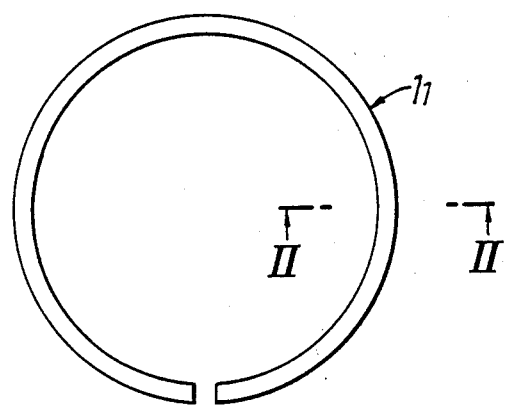
FIG. 1 is a plan view of a piston ring according to a first embodiment.
Figure 2:
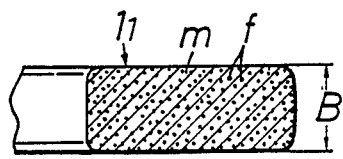
FIG. 2 is a sectional view taken along a line II—II in FIG. 1.

FIGS. 1 and 2 illustrate a first embodiment. A fiber reinforced piston ring 1- for an internal combustion engine according to the first embodiment contains a reinforcing fiber which is a long carbon fiber f with a fiber volume jay fraction of 5 to 60% in a matrix of an aluminum alloy m. The long carbon fiber f is oriented in a peripheral (circumferential) direction of the piston ring.

The long carbon fibers f which may be used include T300 and M40 (trade names) made by Toray Industries, Co., Ltd., P75 and P100 (trade names) made by Union Carbide, Corp., and, in consideration of the fillability of the aluminum alloy m and the rigidity of the piston ring 11, the fiber volume fraction of the carbon long-fiber f is preferably in a range 30 to 40%.

Examples of the aluminum alloys which may be used are those containing 0.1% or more by weight of Si and 0.2 to 6% by weight of Mg, which correspond to such alloys as JIS AC4C, ASTM 2014, 5052 and 7075, etc.

The production of the piston ring $1_1$ is carried out by the following steps: first, adding 20% tricarbosilane solution as a binder to the long carbon fiber to shape an annular form of a square cross section; second, heating the form to a temperature of 100 to 150° C. for a primary sintering; third, heating the form to a temperature of 750 to 1,000° C. in an argon gas atmosphere for a second sintering and then cooling the form; fourth, preheating the form to a temperature of 600° C. in an argon gas atmosphere; fifth, placing the preheated form into a mold and filling a molten aluminum alloy at a temperature of 780 to 820° C. into the form with a filling pressure of 10 to 20 kg/cm² to cast a piston ring, and finally a step of machining the piston ring to the proper dimensions.

Figure 3:
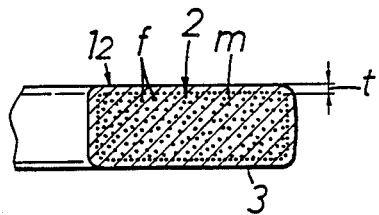
FIG. 3 is a sectional view similar to FIG. 2 of a piston ring according to a second embodiment.

FIG. 3 illustrates a second embodiment wherein the piston ring $1_2$ is comprised of a main annular composite body 2, and a single-material layer 3 covering the surface of the composite body 2. The structure of the main composite body 2 is the same as the piston ring 11 of the first embodiment, and the single-material layer 3 consists of an aluminum alloy which preferably is the same as the material of the matrix of the main composite body 2. The single-material layer 3 is concurrently formed as a step in the casting of the main composite body 2.

If the single-material layer 3 is provided in this manner, the machining properties of the single-material layer 3 and thus the piston ring $1_2$ such as surface-grinding and polishing can be improved, because the single-material layer 3 has a low hardness as compared with the main composite body 2. In addition, the thickness t of the single-material layer 3 can be varied to adjust the average fiber volume fraction of the piston ring $1_2$.

Table 1 illustrates the physical properties of the piston rings $1_1$ and $1_2$ of the first and second embodiments and the prior art piston rings made of a steel and a cast iron for comparison thereof.

In the piston rings $1_1$ and $1_2$ of the first and second embodiments, the long carbon fiber used is P75 (trade name) made by Union Carbide Corp., and the aluminum alloy used is one containing 6% by weight of Si and 0.5% by weight of Mg. The fiber volume fraction of the piston ring $1_2$ of the first embodiment is set in a range of 35 to 40%, while that of the main composite body in the piston ring 12 of the second embodiment is at 20%. Prior art example I is a piston ring formed of a cast iron and has a normal width B (see FIG. 2), while prior art example II is a piston ring formed of a steel and has a reduced width B less than that of example I.

TABLE I

| | S. G. | C. W. (g/cm) | C. P. S. (m/sec.) | Young's modulus (kg/mm₂) |
|---|---|---|---|---|
| First embodiment | 2.3 | 0.12 | 25 | 25,000 |
| Second embodiment | 2.5 | 0.13 | 23 | 17,000 |
| Prior art I | 7.0 | 0.41 | 14.2 | 17,000 |
| Prior art II | 7.9 | 0.27 | 19 | 21,000 |

S. G. = Specific gravity
C. W. = Critical weight
C. P. S. = Critical piston Speed The critical weight is a minimum weight per unit length required for generating no fluttering at a compression-starting pressure (PB) in a range of 0 to −500 mm Hg and is a value related to the critical piston speed.

As apparent from Table I, each of the piston rings $1_1$ and $1_2$ of the first and second embodiments are small in both specific gravity and critical weight as compared with the prior arts examples I and II and correspondingly are increased in critical piston speed, and has a larger Young's modulus and thus, a higher rigidity.

This achieves a reduction in weight of the piston rings $1_1$ and $1_2$ to improve the fluttering resistance thereof. Consequently, the amount of gas blow-by will not increase as the speed of rotation of the engine increases and buckling of the piston rings that might otherwise occur with an increase in output of the engine is prevented. Thus the preferable range of fiber volume fraction includes at least 20% to 40%.

Figure 4:
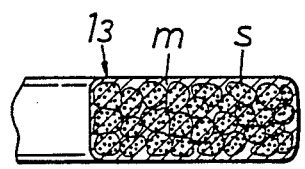
FIG. 4 is a sectional view similar to FIG. 2 of a piston ring according to a third embodiment.

FIG. 4 illustrates a third embodiment wherein a piston ring $1_3$ includes a twist yarn s of long-fiber carbon is used and oriented in the circumferential direction of the piston ring. The fiber volume fraction in this case is of 5 to 30%. Such a construction is further effective for preventing undulation, buckling and the like of the piston ring. Further, if use is made of a cloth having a twist year s with fibers oriented in both the peripheral and radial directions of the piston ring at a predetermined angle, a further improvement can be expected.

Figure 5:
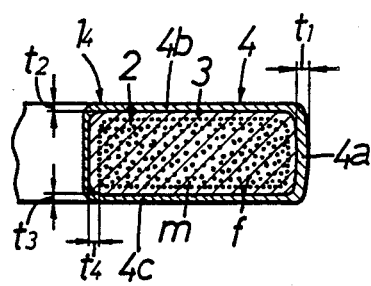
FIG. 5 is a sectional view similar to FIG. 2 of a piston ring according to a fourth embodiment.
Figure 6:
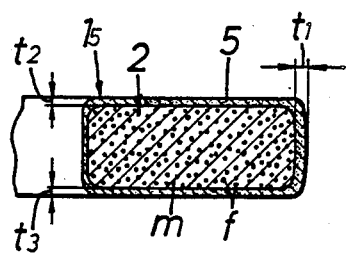
FIG. 6 is a sectional view similar to FIG. 2 of a piston ring according to a fifth embodiment.

FIGS. 5 and 6 illustrate fiber-reinforced piston rings each having improved sliding characteristics with resistances to seizure, wearing and fusing against the inner wall of the cylinder bore and the ring grooves of the pistons that are made of various materials.

FIG. 5 illustrates a fourth embodiment wherein the piston ring $1_4$ comprises a main annular composite body 2, a single-material layer 3 and a hard layer 4 of metal plating covering the single-material layer 3. The structure of the main composite body 2 and the single-material layer 3 is the same as in the piston ring $1_2$ of the second embodiment (see FIG. 3). The hard metal-plating layer 4 is excellent for resisting seizure, wearing and fusing, and such plating layers 4 may include layers of chromium, nickel, nickel-based dispersion, iron-based dispersion, and nickel-based alloy platings.

In the piston ring $1_4$ of FIG. 5, if the long carbon fiber f is exposed on the surface of the main composite body 2, the adhesion of the hard metal-plating layer 4 is inferior, resulting in the possibility that the layer of plating 4 may be released. If the single-material layer 3 is provided in the above-described manner, however, it is possible to improve the adhesion of the layer 3 to the hard metal-plating layer 4. In the hard metal-plating layer 4, the thickness $t_1$ of the portion 4a in slidable contact with the inner wall of the cylinder bore and the thicknesses $t_2$ and $t_3$ of the portions 4b and 4c in slidable contact with opposed inner wall portions of the ring groove are preferably in a range of 5 to 100 μm. In this case, if the thicknesses $t_1$ to $t_3$ are less than 5 μm, the sliding characteristic improvement is smaller. On the other hand, if the thicknesses exceed 100 μm, disadvantages such as cracking and the like are produced in the hard metal-plating layer 4. In order to form such a hard metal-plating layer 4 in a well adhered manner, it is desirable that the thickness $t_4$ of the single-material layer 3 be 10 μm or more.

With respect to the thicknesses $t_1$ to $t_3$, it is also desirable to establish a relation: $t_1 > t_2$ and $t_3$. The reason why the thickness $t_1$ is preferably larger than the thicknesses $t_2$ and $t_3$ is for the purpose of providing the portion 4a with good wear resistance. The reason why the thicknesses $t_2$ and $t_3$ are preferably smaller than the thickness $t_1$ is that if the thickness of the hard metal-plating layer at portions $4_2$ or $4_3$ is larger than the layer at the portion 4a, cracking will be produced in such thicker plating layer, leading to a degrades durability, because of the bending load that acts on the entire piston ring $1_4$ when the portions 4b and 4c engage the inner walls of the ring groove.

FIG. 6 illustrates a fifth embodiment wherein the piston ring $1_5$ is comprised of a main composite body 2 having the same structure as described above with respect to any of the first four embodiments and a ceramic layer 5 on the surface of the main body 2 for providing excellent resistance to seizure, wearing and fusing. Ceramics which may be used are TiN, TiC, Al$_2$O$_3$, CrN, etc., and the ceramic may be coated onto the surface of the main composite body 2 by a physical vapor deposition (PVD) method or by other conventional methods. In this case, if the long carbon fiber f is exposed on the surface of the main composite body 2, the ceramics can be reliably deposited. Consequently, a ceramic layer 5 having a good adhesion is provided.

The thicknesses $t_1$ to $t_3$ in FIG. 6 may be in a range of 0.1 to 10 μm, preferably 3 to 6 μm, and the reasons why the thicknesses are limited are the same as described above with respect to the fourth embodiment of FIG. 5. With the thicknesses $t_1$ to $t_3$, it is desirable to establish a relation: $t_1 > t_2$ and $t_3$, as described above. It is also possible, of course, that a ceramic layer 5 may be provided on the surface of a single-material layer 3 as shown in FIG. 5 for the hard metal-plating layer 4.

Figure 7:
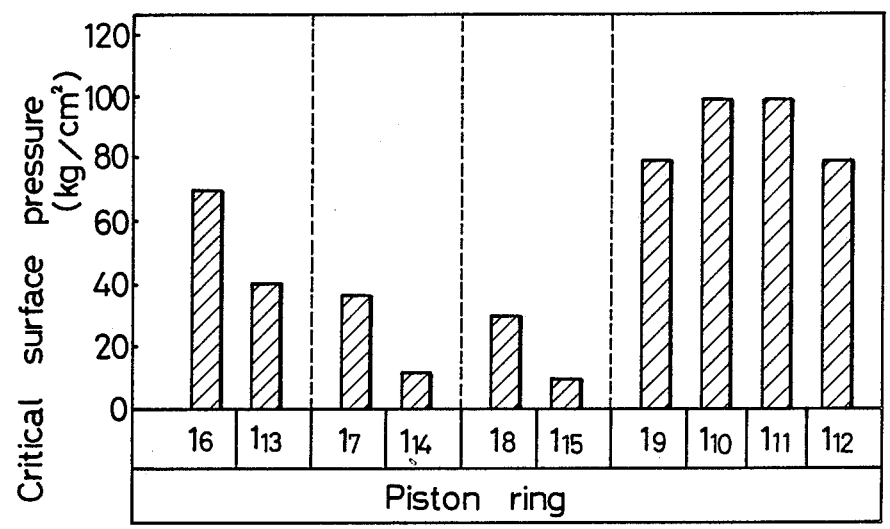
FIG. 7 is a graph illustrating results of a seizure-resistance test.

FIG. 7 illustrates the results of a seizure-resistance test for piston rings $1_6$ to $1_{12}$ having a hard layer and piston rings $1_{13}$ to $1_{15}$ having no hard layer. The test was carried out in a dry manner, wherein the speed of the rotary disks simulating the component of the cylinder bore inner wall on the ring groove inner wall is set at 2.5 m/sec and the stationary element simulates the component of the piston ring in the tests. The combination of each of the piston rings $1_6$ to $1_{15}$ with the cylinder bore inner wall component is as given in the following Table II. In Table II, CFRM, indicates a composite material of a long carbon fiber and an aluminum alloy matrix. As described above, the long carbon fiber used is P75 (trade name) made by Union Carbide Corp., and the aluminum alloy used is one containing 6% by weight of Si and 0.5% by weight of Mg. The piston rings $1_6$ to $1_9$ have the structure shown in FIG. 5; the piston rings $1_{10}$ and $1_{11}$ have the structure shown in FIG. 6, and the piston rings $1_{13}$ to $1_{15}$ have the structure shown in FIG. 2 The fiber volume fraction of each of the piston rings $1_6$ to $1_{15}$ is of 40%.

TABLE II (a) Piston rings $1_6$ and $1_{13}$

| | Piston ring | |
|---|---|---|
| | $1_6$ | $1_{13}$ |
| Piston ring component | CFRM, chromium plating layer | CFRM |
| Cylinder bore inner wall component | Cast iron | Cast iron |
| Thickness of the plating layer: 50 μm | | |

(b) Piston rings $1_7$ and $1_{14}$

| | Piston ring | |
|---|---|---|
| | $1_7$ | $1_{14}$ |
| Piston ring component | CFRM, chromium plating layer | CFRM |
| Cylinder bore inner wall component | A-390 (Al—Si alloy) | A-390 |
| Thickness of the plating layer: 50 μm | | |

(c) Piston rings $1_8$ and $1_{15}$

| | Piston ring | |
|---|---|---|
| | $1_8$ | $1_{15}$ |
| Piston ring component | CFRM, iron-based dispersion plating layer | CFRM |
| Cylinder bore inner wall component | Cast iron | Cast iron |
| Thickness of the plating layer: 30 μm | | |

(d) Piston ring $1_9$

| | Piston ring |
|---|---|
| | $1_9$ |
| Piston ring component | CFRM, SiC particle-dispersed Ni—P plating layer |
| Cylinder bore inner wall component | Cast iron |
| Thickness of the plating layer: 30 μm | |
| Content of SiC particles: 15% by weight | |

(e) Piston ring $1_{10}$

| | Piston ring $1_{10}$ |
|---|---|
| Piston ring component | CFRM, TiN coating layer |
| Cylinder bore inner wall component | Cast iron |
| Thickness of the coating layer: 5 μm | |

(f) Piston ring $1_{11}$

| | Piston ring $1_{11}$ |
|---|---|
| Piston ring component | CFRM, CrN coating layer |
| Cylinder bore inner wall component | Cast iron |
| Thickness of the coating layer: 5 μm | |

(g) Piston ring $1_{12}$

| | Piston ring $1_{12}$ |
|---|---|
| Piston ring component | CFRM, Ni alloy plating layer |
| Cylinder bore inner wall component | Cast iron |
| The Ni alloy plating layer contains 0.5–3.0% by weight of B and 2.0–6.0% by weight of W. | |
| Thickness of the coating layer: 15 μm | |

As is apparent from FIG. 7, each of the piston rings $1_6$ to $1_{12}$ having a hard layer has a higher seizure-resistance as compared with the similar piston rings $1_{13}$ to $1_{15}$ having no hard layer, and each of the piston rings $1_9$ to $1_{12}$ having the hard layer exhibits a particularly excellent seizure-resistance.

Although the invention has been described in connection with five specific embodiments, it will be apparent to those skilled in the art the many or variations and combinations are possible without departing from the scope of the invention as defined in the following claims.

What is claimed is:

1. A fiber-reinforced piston ring for an internal combustion engine, comprising a main annular composite body formed of a reinforcing fiber of long carbon fibers oriented in a circumferential direction of the piston ring in a matrix of an aluminum alloy and having a fiber volume fraction in a range of 5% to 60%, and a hard layer covering the entire surface of the main composite layer, wherein said hard layer is provided with a greater thickness on a surface portion of the piston ring that slidably engages the cylinder wall of the engine than the thickness on the remaining surfaces.

2. A fiber-reinforced piston ring for an internal combustion engine, comprising a main annular composite body formed of a reinforcing fiber of long carbon fibers oriented in a circumferential direction of the piston ring in a matrix of an aluminum alloy and having a fiber volume fraction in a range of 5% to 60%, a single-material layer formed of an aluminum alloy and covering the surface of said main composite body, and a hard layer covering the entire surface of said single-material layer, wherein said hard layer is provided with a greater thickness on a surface portion of the piston ring that slidably engages the cylinder wall of the engine than the thickness on the remaining surfaces.

3. A fiber-reinforced piston ring for an internal combustion engine according to claim 2, wherein said hard layer is a hard layer of a metal plating.

4. A fiber-reinforced piston ring for an internal combustion engine according to claim 2, wherein said hard layer is a ceramic layer.

5. A fiber-reinforced piston ring for an internal combustion engine according to claim 1, wherein said hard layer is a ceramic layer.

6. A fiber-reinforced piston ring for an internal combustion engine according to claim 3, 4, 5, 1 or 2, wherein said reinforcing fiber is comprised of a plurality of twist yarns of the long carbon fibers.

7. A fiber-reinforced piston ring for an internal combustion engine according to claim 3, 4, 5, 1 or 2, wherein said fiber volume fraction is in a range of 20% to 40%.

8. A fiber-reinforced piston ring for an internal combustion engine according to claim 3, 4, 5, 1 or 2, wherein said hard layer is of a thickness in a range of 5 um to 100 um.

* * * * *

UNITED STATES PATENT AND TRADEMARK OFFICE
CERTIFICATE OF CORRECTION

PATENT NO. : 4,941,669

DATED : July 17, 1990

INVENTOR(S) : Yoshikazu Fujisawa, Tsunehisa Hata & Tadayoshi Hayashi

It is certified that error appears in the above-identified patent and that said Letters Patent is hereby corrected as shown below:

On the Title Page, under "Foreign Application Priority Data" change "Jan. 24, 1988" (in both occurrences) to -- Feb. 24, 1988 --.

Signed and Sealed this

Sixth Day of April, 1993

Attest:

STEPHEN G. KUNIN

Attesting Officer

Acting Commissioner of Patents and Trademarks